United States Patent
Lasaruk et al.

(10) Patent No.: US 12,437,444 B2
(45) Date of Patent: Oct. 7, 2025

(54) DYNAMIC AUTOCALIBRATION OF A VEHICLE CAMERA SYSTEM BEHIND A WINDSHIELD

(71) Applicant: AUMOVIO Autonomous Mobility Germany GmbH, Ingolstadt (DE)

(72) Inventors: Aless Lasaruk, Meckenbeuren (DE); Felix Hachfeld, Lindau (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 0 days.

(21) Appl. No.: 18/718,348

(22) PCT Filed: Nov. 10, 2022

(86) PCT No.: PCT/DE2022/200263
§ 371 (c)(1),
(2) Date: Jun. 10, 2024

(87) PCT Pub. No.: WO2023/104254
PCT Pub. Date: Jun. 15, 2023

(65) Prior Publication Data
US 2025/0139829 A1 May 1, 2025

(30) Foreign Application Priority Data
Dec. 9, 2021 (DE) .................... 10 2021 214 040.8

(51) Int. Cl.
*G06T 7/80* (2017.01)
*G06T 7/246* (2017.01)
*H04N 17/00* (2006.01)

(52) U.S. Cl.
CPC ............. *G06T 7/80* (2017.01); *G06T 7/246* (2017.01); *H04N 17/002* (2013.01); *G06T 2207/10016* (2013.01); *G06T 2207/30261* (2013.01)

(58) Field of Classification Search
CPC .. G06T 7/80; G06T 7/85; G06T 7/246; G06T 2207/10016; G06T 2207/30261; H04N 17/002
See application file for complete search history.

(56) References Cited

U.S. PATENT DOCUMENTS 9,794,552 B1 * 10/2017 Ribble ................. H04N 17/002
10,554,951 B2 * 2/2020 Lasaruk .................... G06T 7/80
(Continued)

FOREIGN PATENT DOCUMENTS

| CN | 103136747 A | 6/2013 |
|---|---|---|
| DE | 102016222548 A1 | 5/2018 |

(Continued)

OTHER PUBLICATIONS

German Office Action dated Jan. 9, 2023 for the priority German Patent Application No. 10 2021 214 040.8 and machine translation of same.

(Continued)

*Primary Examiner* — Brian P Yenke
(74) *Attorney, Agent, or Firm* — Buchanan Ingersoll & Rooney PC

(57) ABSTRACT

A method and device for vehicle camera autocalibration during vehicle travel for driver assistance systems and automated driving. A vehicle camera images a region of vehicle surroundings through a window. The method includes: providing a vehicle camera projection model including multiple extrinsic parameters, at least one intrinsic vehicle camera parameter and at least one window parameter; capturing a sequence of camera images during vehicle cornering; determining a curve type during the cornering; estimating the parameters using pixels in the sequence of images of stationary objects in the vehicle surroundings, the current vehicle movement, and the determined curve type, by minimizing an error function indicating the deviation (Continued)

between pixels which correspond to stationary objects in the vehicle surroundings and which are established from the sequence of images and pixels of the stationary objects which are projected by the projection model; and outputting at least one of the estimated parameters.

15 Claims, 7 Drawing Sheets

(56) References Cited

U.S. PATENT DOCUMENTS

| | | | |
|---|---|---|---|
| 2013/0135474 A1 | 5/2013 | Sakano et al. | |
| 2017/0070725 A1* | 3/2017 | Kishiwada | G06T 7/85 |
| 2018/0108150 A1* | 4/2018 | Curtis | G06T 7/246 |
| 2019/0297314 A1* | 9/2019 | Lasaruk | G06V 20/56 |
| 2020/0051282 A1* | 2/2020 | Watanabe | G06T 7/593 |
| 2022/0270358 A1* | 8/2022 | Cox | G06V 10/811 |
| 2024/0020865 A1* | 1/2024 | Shiozawa | G06T 5/80 |
| 2024/0054678 A1* | 2/2024 | Lasaruk | G06T 7/80 |
| 2024/0096113 A1* | 3/2024 | Wang | G06V 20/588 |
| 2024/0144638 A1* | 5/2024 | Abbeloos | G06V 10/44 |

FOREIGN PATENT DOCUMENTS

| | | |
|---|---|---|
| DE | 102018204451 A1 | 9/2019 |
| EP | 2 902 967 A1 | 8/2015 |
| EP | 3 505 865 A1 | 7/2019 |
| EP | 3293701 B1 | 11/2019 |
| JP | 2013-115540 A | 6/2013 |
| JP | 2015-163866 A | 9/2015 |
| WO | 2018/042954 A1 | 3/2018 |
| WO | 2021004642 A1 | 1/2021 |

OTHER PUBLICATIONS

German Notice of Allowance dated Jul. 12, 2022 for the priority German Patent Application No. 10 2021 214 040.8 and machine translation of same.

The International Search Report and the Written Opinion of the International Searching Authority mailed on Feb. 20, 2022 for the PCT Application No. PCT/DE2022/200263 which this application claims priority.

Changchang Wu, "Critical Configurations For Radial Distortion Self-Calibration", 2014 IEEE Conference on Computer Vision and Pattern Recognition, Date of Conference: Jun. 23-28, 2014, DOI: 10.1109/CVPR.2014.11.

Peter Sturm, "Critical Motion Sequences for Monocular Self-Calibration and Uncalibrated Euclidean Reconstruction", Proceedings of IEEE Computer Society Conference on Computer Vision and Pattern Recognition, Date of Conference: Jun. 17-19, 1997, DOI: 10.1109/CVPR. 1997.609467.

Richard Hartley et al., "Multiple View Geometry in Computer Vision," Cambridge University Press, 2000, pp. 262-274.

Office Action (Notice of Reasons for Refusal) issued Apr. 30, 2025, by the Japan Patent Office in corresponding Japanese Patent Application No. 2024-531109 and an English translation of the Office Action. (7 pages).

* cited by examiner

DYNAMIC AUTOCALIBRATION OF A VEHICLE CAMERA SYSTEM BEHIND A WINDSHIELD

CROSS-REFERENCE TO RELATED APPLICATIONS

The present application is a National Stage Application under 35 U.S.C. § 371 of International Patent Application No. PCT/DE2022/200263 filed on Nov. 10, 2022, and claims priority from German Patent Application No. 10 2021 214 040.8 filed on Dec. 9, 2021, in the German Patent and Trademark Office, the disclosures of which are herein incorporated by reference in their entireties.

TECHNICAL FIELD

The invention relates to a method and a device for the autocalibration of a vehicle camera system, which can in particular be used in the vehicle as a sensor system for driver assistance systems and automated driving and captures the surroundings through a window.

BACKGROUND

DE 102018204451 A1 discloses a method and a device for the autocalibration of a monocular vehicle camera. The method has the following steps:
a) capturing a sequence of images from the vehicle camera, wherein the vehicle camera images a region of the surroundings in front of the vehicle,
b) recognizing a cornering maneuver of the vehicle suitable for an autocalibration when the curve radius described by the vehicle is less than or equal to a defined maximum radius, and the traversed curve angle is greater than or equal to a defined minimum angle,
c) performing autocalibration when at least one cornering maneuver has been recognized as suitable for autocalibration, wherein
d) the autocalibration is carried out in a cornering maneuver suitable for autocalibration, taking account of movement of stationary objects in the surroundings of the vehicle.

Camera calibration is an essential part of the surroundings capturing of an Advanced Driver Assistance System (ADAS) or a system for automated driving (AD) by a camera system mounted in or on the vehicle. The camera system tracks the movements of the vehicle or likewise runs through these. In order to calibrate cameras, the parameters of a formal relationship (projection) between three-dimensional spatial points and corresponding pixels of a physical camera system are established by an estimation method. The established parameters are subsequently saved in the ADAS system for further use. The projection specification contains a description of the light propagation paths within the optical system of the camera (intrinsic parameters) as well as the position and orientation with respect to a fixedly referenced coordinate system on the vehicle (extrinsic parameters).

If the parameters of the projection specification are precisely established, measuring capturing of the spatial surroundings of the vehicle with structure-from-movement (SFM) or multi-view methods is possible during travel. If the parameters of the projection specification deviate slightly from the actual projection specification, this can lead to imprecise results in subsequent methods which utilize the distance established from image data of the camera (e.g., Adaptive Cruise Control (ACC) or Emergency Braking Assist (EBA) or Automatic Emergency Braking (AEB)) or the angle (e.g., Lane Keeping Assistance (LKA) or Head Lamp Assist (HLA)) with respect to imaged objects. If the parameters of the projection specification deviate greatly from the actual projection specification, this can lead to the ADAS/AD system being restricted or unavailable (short-term or permanent failure).

Typically, an ADAS camera is deployed in the vehicle behind a windshield or the protective glass of a vehicle. The windscreen/window constitutes an additional optical system and significantly changes the projection specification of a camera, which is described above, compared to a setup in which no windshield is present between the scene and the camera. In order to guarantee that the following methods operate precisely, it is essential to take account of the windshield during the calibration of the camera.

An established process of calibrating the cameras of ADAS camera systems comprises multiple steps. This includes camera calibration at the end of the camera production line, at the end of the vehicle production line, as well as autocalibration of the camera during travel. Calibration during production (regardless of whether this is camera or vehicle production) serves as a starting solution or as the basis for the two further steps and, consequently, forms the basis for capturing the surroundings in a robust manner in the vehicle.

It is, in principle, conceivable to calibrate a camera at the end of the camera production line together with a windscreen. Due to the variety of different windshield types and due to the individual installation position of each camera behind each windshield, the corresponding projection specifications are also individual. From a practical point of view, it is therefore not possible, nor does it make sense, to carry out calibration during the camera production.

It is also, in principle, conceivable to calibrate a camera at the end of the vehicle production line together with the particular windshield. The latter procedure also constitutes the most frequently deployed prior art. If this option is selected, it is obvious that the optical system has to be recalibrated if the window is replaced. Due to the demands placed on the precision of the camera calibration, the calibration in the manner described above is very complex and consequently expensive. Extremely precisely manufactured targets are used for this purpose. Furthermore, the vehicle is adjusted extremely precisely with a complex and expensive special device for the calibration. Typically, it is merely the extrinsic parameters which can be readjusted in the manner described above.

The influence of the windshield on the optical paths of the light through the camera is, for the most part, still not taken account of. Even if the calibration in accordance with the prior art solves part of the problem, the calibration described above does not cover the specific application that the optical system consisting of the ADAS camera and the windshield changes during travel. Therefore, there is always a risk that the ADAS system is used with incorrectly estimated parameters and, consequently, with restricted functionality by the end customer or the driver of the vehicle having the driver assistance system.

SUMMARY

It is the problem of the present disclosure to provide solutions in terms of simplifying and improving the camera calibration process.

The problem is addressed by subject-matter having the features of the independent claims. Example embodiments are the subject-matter of the subclaims.

One aspect of the solution is achieved in that the calibration of the entire optical system made up of the window and the camera does not take place at the end of the vehicle production line, but rather dynamically in the vehicle during travel and is continuously improved. Dynamic autocalibration can also be referred to as online calibration.

One aspect is that the process for calibrating an ADAS camera system when deployed behind a windscreen or protective glass can be considerably simplified during the manufacture of the camera.

One aspect of the present disclosure relates to a device and a method for estimating the set of parameters of an ADAS camera system when the vehicle is traveling. An advantage of the present disclosure is that no extremely precisely manufactured targets are necessary for the calibration.

The method utilizes the motionless proportion of the (unknown) traffic scene in front of the vehicle in order to calibrate the effect of the windshield. In order to accomplish this, a special optical model made up of a windscreen and camera combination is needed.

It is known from experiences in the literature that it is not always possible to estimate the parameters of such a model. It is also known from the prior art that the calibration of specific parameters can be performed during specific advantageous journeys and with specific advantageous camera configurations. In this case, e.g., non-vanishing (e.g., radial) distortions are advantageous. In one embodiment of the present disclosure, an assessment of which parameters can be estimated during which travel trajectory can be learnt during travel due to past experiences. Thanks to these two properties, a quality of the calibration which is comparable to industrial standards can be achieved after just a few measurements.

One aspect of the present disclosure relates to a device (e.g., a controller) for calculating the calibration of a camera system which is installed in a vehicle.

One aspect of the present disclosure relates to an estimation of the driving movement or driving geometry of the vehicle during cornering (that is to say, an estimation of the cornering movement) and the latter being taken account of when estimating the parameters of the camera system.

A further aspect relates to taking account of at least one parameter which characterizes the window.

One aspect of the solution relates to the realization or assumption that, during particular cornering maneuvers, autocalibration of an optical overall model made up of the windscreen and a camera is possible with the aid of the bundle adjustment method. The method can be configured to learn the relationship between the curve type and the parameters which can be established. The latter constitutes a significant innovative step compared with the given prior art.

One aspect of the present disclosure relates to setting up a library or a type of experience database in which information is stored regarding during which type of journey or curve which parameters can be updated or recalibrated. The use of the library makes it possible for more cornering maneuvers to be used for the calibration, compared to the method of DE 102018204451 A1, and to have a procedure for finding out specifically which parameters can be recalibrated and when.

The device and the method are designed such that the necessary data for initializing the bundle adjustment algorithm can be provided with a good starting solution. Thanks to filtering, the results of many cornering maneuvers can lead to a considerable improvement in the precision which can compete with the precision of the production calibration.

The solution affords the advantage of a considerable simplification of test systems in the production of ADAS systems for vehicle manufacturers and of test or calibration systems for repair workshops during exchange of camera systems or vehicle windows. Therefore, the process of manufacturing and maintaining ADAS systems is enormously simplified and made less expensive.

First of all, aspects of the solution are classified below in the context known from the literature:

Selected Literature:
[1] Hartley, Zissermann, Multiple View Geometry in Computer Vision, 2000, Cambridge University Press, ISBN: 0521623049 (first edition).
[2] Peter Sturm: Critical motion sequences for monocular self-calibration and uncalibrated euclidean reconstruction, CVPR, 1997, pp. 1100-1105.
[3] C. Wu: Critical configurations for radial distortion self-calibration. In CVPR, 2014.

Targetless calibration of cameras is well-known in the literature [1]. The calibration methods are subdivided into methods for estimating a (more or less rough) starting solution of the parameters and methods for improving an existing solution. The former methods are of an algebraic nature. Due to the complex algorithms and poor robustness, they are only suitable for practical solutions in special cases. Furthermore, such methods are of little relevance for ADAS purposes, since in the ADAS world typically very good starting solutions are known from production. In the case of practical applications, operations are, for the most part, restricted for automotive purposes to improvement of a continuously estimated calibration, wherein the latest estimated parameters constitute a very good starting solution for the algorithms. The category of the optimal methods known as the "Gold Standard" [1] is called bundle adjustment (in [1], the term "Gold Standard" is mentioned in section 10.4.1 in connection with the bundle adjustment in algorithm 10.3.).

The existing literature does not satisfactorily cover the case of a windscreen being incorporated into the optical system. Patent EP 3293701 B1 is deemed to be prior art of some relevance. It discloses a method for calibrating a camera-based system of a vehicle with a windshield. An imaging target in the form of a plate having a known pattern is placed in the field of view of a camera of the camera-based system such that the camera can record a calibration image of the plate through the windshield. Precisely one calibration image of the plate is recorded with the camera. The calibration image is compared to the known pattern. Windshield distortion which is introduced by the windshield is calculated using a camera model which includes parameters which represent distortion properties of the windshield. The intrinsic parameters of the camera are assumed to be known.

The window distortion is stored in the camera-based system.

It has already been recognized that, for practical implementation, there is a series of non-trivial questions which have not been clearly answered to date in the literature. The problem with the prior art exists in the so-called "critical configurations" for the calibration. These can be regarded as an unfavorable assemblage of a camera model, a scene geometry as well as a vehicle movement in which the bundle adjustment problem has no unambiguous solution or the true solution is close to an ambiguous solution. In all of these cases, this can result in an incorrect estimation of the intrinsic parameters, which is in principle arbitrarily far away from the true parameters.

Peter Sturm describes a complete taxonomy of critical configurations for the autocalibration of a pinhole camera in [2]. It is obvious from this fundamental work that all movements in one plane (e.g., over a cornering maneuver) are critical for a pinhole camera, regardless of the scene. However, a vehicle having an ADAS system, in practice, performs substantially planar movements at short time intervals (a few seconds). In summary, if the pure pinhole camera model is used for modeling the camera, intrinsic autocalibration in a vehicle in a short period of time is almost always difficult, if not impossible.

Following Peter Sturm (in the 1990s), the literature has paid little attention to the problem of the unambiguity of autocalibration for more complex camera models. Critical configurations for radial distortions and an un-distortion function are merely dealt with in C. Wu [3]. The failures are partly due to the fact that there are no formal ways of investigating critical configurations.

However, it is known from the literature that it is possible to judge the result of a bundle adjustment procedure on the basis of higher derivatives of the error function. This property can be advantageously exploited in one embodiment of the present disclosure.

There are currently no investigations of critical configurations for windshield models in the literature, because practically established mathematical models for such optical systems do not exist to date. To date, the methods mentioned above have not been applied to the newly created optical models. In the following sections, practicable procedures for implementing the autocalibration in practice are indicated and explained in more detail.

A method according to the present disclosure for the autocalibration of a vehicle camera which images a region of the surroundings of the vehicle through a (transparent) window during travel of the vehicle, includes the following steps:

a) providing a projection model of the vehicle camera, wherein the projection model includes, as parameters, multiple extrinsic parameters, one or more intrinsic parameters of the vehicle camera and at least one parameter characterizing the window,
b) capturing a sequence of images on the part of the vehicle camera during cornering by the vehicle,
c) determining a curve type on the basis of the current movement of the vehicle during cornering, by way of example by means of a curve estimator,
d) estimating the parameters [to be recalibrated], taking account of pixels or image features or correspondences in the sequence of images which correspond to stationary objects in the surroundings of the vehicle, the current movement of the vehicle, and the determined curve type.

The parameters are estimated by minimizing an error function (or "loss function") indicating the deviation between pixels/image features which correspond to stationary objects in the surroundings of the vehicle and which are established from the sequence of images and pixels of the stationary objects which are projected by means of the projection model, e) outputting at least one of the estimated parameters.

A vehicle camera can also refer to a vehicle camera system. In the simplest case, the vehicle camera corresponds to a monocular camera. If the vehicle camera system includes multiple monocular cameras, these can be calibrated as individual cameras. However, it is optionally possible to take account of similarities during the calibration which relate to multiple cameras. If all of the cameras of a vehicle system are permanently installed in the vehicle, the vehicle movement is the same for all of the cameras, for example.

The window can be a (glass) window in the beam path of the camera, for example a vehicle window such as, e.g., a windshield, rear window or side window of the vehicle, through which the camera captures the surroundings of the vehicle.

The parameters depend on the projection model of the camera. During the stage of "providing the projection model," a decision is made in practice regarding the mathematical model to be used for modeling the world. This features extrinsic, one or more intrinsic parameters of the camera and at least one parameter characterizing the window.

Extrinsic parameters define the position and orientation of the camera in the world. That is to say, they provide information about the relationship between world and camera coordinates. During a movement of the camera, the camera poses change due to translation and rotation. In the case of cameras which are permanently installed in the vehicle, the camera movement is predefined by the vehicle movement. The estimated curve information or the odometry data used for this can be utilized for the initialization of the extrinsic parameters during the bundle adjustment in order to estimate all of the parameters. At the end of the bundle adjustment, only the intrinsic and window parameters are frequently of interest, the rest are discarded.

Intrinsic parameters allow mapping of camera coordinates to pixel positions. Examples of intrinsic parameters are the focal length, the principal point (or the center of the image), the size of a pixel in the horizontal and vertical directions, and distortion factors which provide information about (e.g., radial) distortions.

At least one parameter characterizing the window can be, for example, the thickness of the window. Additionally, the orientation of the window can be a characterizing parameter. The orientation of the window can be indicated by the normal vector of the window. The orientation of the window to the viewing direction or optical axis of the camera defines the angle of incidence of the beam path. A further window parameter can be the refractive index of the window material.

The error function can have the spatial points (of stationary objects), extrinsic camera parameters or camera poses, intrinsic camera parameters and window parameters as variables. The coordinates of the spatial points are alternatively estimated as well.

In one embodiment, following the step of estimating the parameters, it is checked whether the calibration has succeeded on the basis of a threshold for the minimized error function.

According to one embodiment, in the event that the calibration has succeeded, an ambiguity analysis or a validation is carried out as to which parameter(s) has/have been estimated precisely enough and this (these) parameter(s) is/are output. All of the parameters and the information as to which parameter(s) could be estimated precisely enough can also be output. In one embodiment, an update of all of the variable parameters should only be considered if the covariance analysis does not indicate any ambiguities. In the case of an estimation with partially ambiguous parameters, there is a risk that other parameters have also been determined imprecisely. And if that was the case (that is to say, no ambiguities indicated), only those parameters which have been estimated "well enough" according to repeated covariance analysis should be updated.

In one embodiment, in addition to the estimated parameters, an item of information is output to a library. The library includes an assignment of curve types traveled through to parameters which can be estimated in each case (well or unambiguously according to previous knowledge). The library can be integrated into the driving geometry estimator. The output information indicates whether an estimation is successful (and unambiguous) for one or more parameters ("to be recalibrated") for the type of curve currently being traveled through, and (if so) for which parameter(s) this is the case. In other words, what is meant is that the cornering, on the basis of which the current (and successful) estimation is being carried out, is assigned to a curve type and the knowledge that specific parameters (as a result of the ambiguity analysis) can be estimated well for this curve type.

According to one exemplary embodiment, an appraisal of the estimability of parameters to be recalibrated for the current curve type is carried out, in particular by referring to the library. That is to say that one or more parameters to be recalibrated are established, for which estimability is expected in the case of the specific curve type. These parameters can be referred to as free parameters. The remaining parameter(s) is/are fixed.

The actual estimation of the parameter(s) to be recalibrated is only conducted if estimability does exist. Otherwise, the method is performed again (in the next time step).

In one embodiment, the ambiguity analysis includes a covariance evaluation.

According to one embodiment, the intrinsic and/or window parameters are initialized by adopting the intrinsic and/or window parameters from a factory calibration of the vehicle camera.

According to one exemplary embodiment, a starting solution for the extrinsic parameters is determined from the current movement of the vehicle (e.g., defined by movement data from the odometry) during cornering. In this way, the geometry of the driving movement can be included in the estimation of the parameters.

In one embodiment, pixels/image features which correspond to stationary objects in the surroundings of the vehicle are established from the sequence of images by means of an optical flow estimator and/or a flow tracker.

According to one exemplary embodiment, the window is the windshield of the vehicle.

A further subject-matter of the present disclosure relates to a device for the autocalibration of a vehicle camera during travel of the vehicle. The device includes the vehicle camera, a computing unit, a curve estimator or a curve estimation unit and an output unit.

The vehicle camera is configured to image a region of the surroundings of the vehicle through a window (of the vehicle).

The computing unit is configured to provide a projection model of the vehicle camera, wherein the projection model includes, as parameters, multiple extrinsic parameters, at least one intrinsic parameter of the vehicle camera and at least one parameter characterizing the window.

The vehicle camera is configured to capture a sequence of images during cornering by the vehicle.

The computing unit is configured to estimate parameters, taking account of:
pixels in the sequence of images of stationary objects in the surroundings of the vehicle,
the current movement of the vehicle, and
the (currently) determined curve type.

The parameters are estimated by minimizing an error function indicating the deviation between pixels which correspond to stationary objects in the surroundings of the vehicle and which are established from the sequence of images and pixels of the stationary objects which are projected by means of the projection model.

The output unit is configured to output the estimated parameters.

The device and/or the computing unit can in particular include a microcontroller or processor, a central processing unit (CPU), a graphics processing unit (GPU), a digital signal processor (DSP), an Application Specific Integrated Circuit (ASIC), a field-programmable gate array (FPGA) and so forth as well as software for performing the corresponding method steps.

A further subject-matter of the present disclosure relates to a vehicle having a vehicle camera and a corresponding autocalibration device.

A further subject matter of the present disclosure relates to a computer program element which, when a data processing unit or a controller is programmed therewith, instructs the data processing unit to perform a method according to the present disclosure.

A further subject-matter of the present disclosure relates to a computer-readable storage medium on which a computer program element according to the present disclosure is stored.

The present disclosure can consequently be implemented in digital electronic circuits, computer hardware, firmware or software.

BRIEF DESCRIPTION OF THE DRAWINGS

Exemplary embodiments are described below and specific aspects are explained in greater detail with reference to figures, wherein.

DETAILED DESCRIPTION

Figure 3:
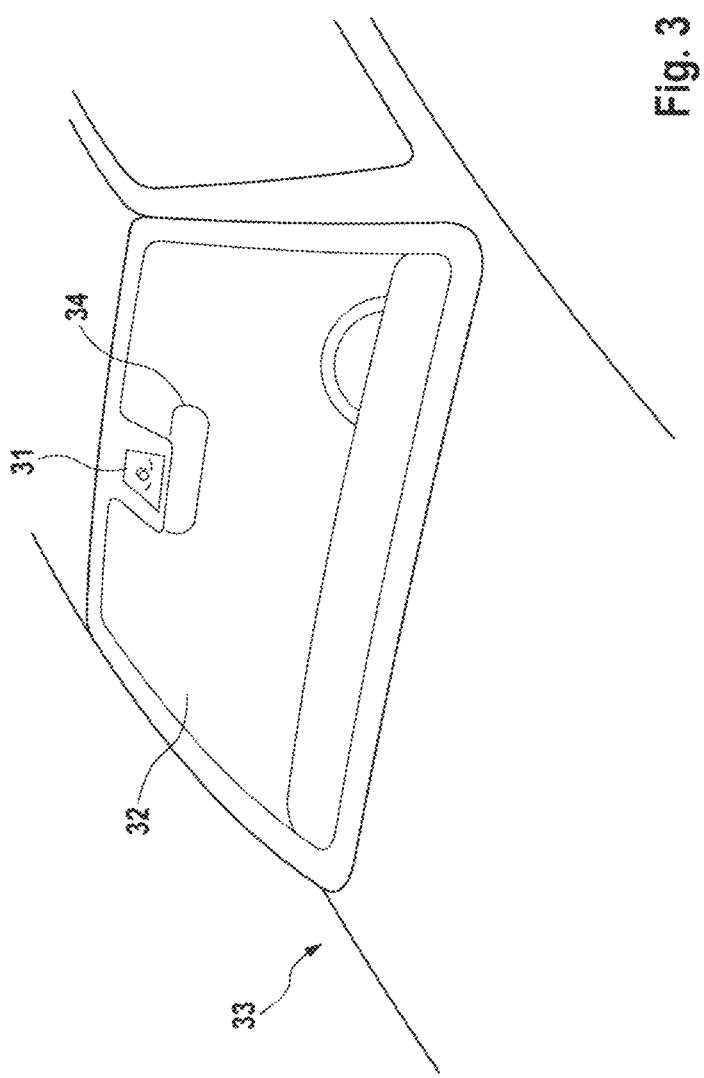
FIG. 3 shows an ADAS camera mounted inside a vehicle behind the windscreen, FIG. 4 schematically shows an ADAS camera which images a scene outside the vehicle through the windscreen.

FIG. 3 illustrates the initial situation:

A vehicle camera 31 of a driver assistance system is mounted inside a vehicle 33 behind the windshield 32 approximately in the region of (above) the rear-view mirror 34. The vehicle camera 31 roughly looks forwards, i.e., it captures the surroundings or the environment in front of the vehicle 33.

Figure 4:
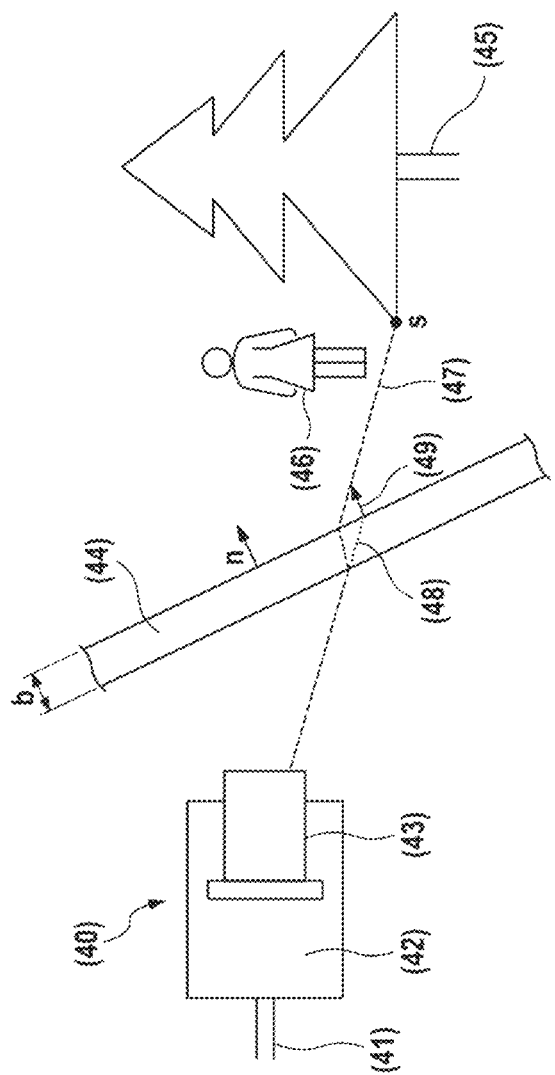

FIG. 4 very schematically illustrates a situation during travel of the vehicle 33. A (vehicle) camera 40 in the vehicle 33 includes a housing 42, a camera optical system 43 and an electrical connection 41 to a computing unit. The windshield 44 of the vehicle 33 can be modelled as a plane-parallel transparent window. The camera optical system 43 is focused on a region outside the vehicle 33; in this respect, the windshield 44 can be considered to be a nearly plane-parallel window. The vehicle camera 40 captures a scene of the current surroundings of the vehicle through the windscreen 44. The camera optical system 43 or the camera lens can include, for example, a fisheye lens or a rectilinear wide-angle lens. The camera optical system causes a scene outside the vehicle to be focused on the image sensor of the camera 40. The image sensor can be a CMOS or CCD sensor, for example. The raw image captured by the image sensor is further processed by a computing unit.

The scene includes motionless components 45 ("stationary objects") such as, for example, the schematically depicted tree or a building which is not depicted, road signs, bridges, buildings, etc., and dynamic components 46 such as, for example, a moving pedestrian. When the vehicle 33 moves, the vehicle camera 40 (and also the windshield 44) is also moved.

The windshield 44 in front of the camera 40 or, in general, protective glass behind which another camera can be arranged, is characterized in that the refractive medium approximately constitutes a plane-parallel plate having a thickness b. This includes, for example, all protective glasses of cameras having a flat exit opening as well as glass windows of vehicles. The normal vector n indicates the orientation perpendicular to the plane of the windshield in the region close to the vehicle camera 40. The windscreen has a refractive index or index of refraction v. In FIG. 4, a spatial point s is shown, e.g., a boundary point of a tree 45 or of a stationary object. An optical path 47 of a light beam is schematically depicted as a dashed line, which is deflected, starting from the spatial point s through the windscreen 44 and is focused by the camera optical system 43 on an image sensor of the vehicle camera 40.

The offset of the optical path 47 through the windshield can be represented or approximated by a parallel shift 49 of a virtual light beam 48 (dotted line) entering the windshield, unhindered. The parallel shift 49 is the product of a window or slab shift σ having the normal vector n.

The window shift σ can be approximated as a constant, in particular as b (v−1)/v. This approximation can be calculated quickly, but is only sufficiently precise for small angles of incidence.

Alternatively, the window shift σ can be calculated as the root $\sigma_0$ of the quartic function $$g(\sigma) = a_4\sigma^4 + a_3\sigma^3 + a_2\sigma^2 + a_1\sigma + a_0, \text{ wherein}$$

$$0 \le \sigma_0 \le b,$$

$$a_4 = v^2,$$

$$a_3 = -2v^2(w+b),$$

$$a_2 = (v^2 - 1)(u^2 + b^2) + v^2 w(w + 4b),$$

$$a_1 = -2b[v^2(w^2 + u^2) + bw(v^2 - 1) - u^2],$$

$$a_0 = (v^2 - 1)b^2(w^2 + u^2),$$

$$w = n \cdot s \text{ and}$$

$$u = \sqrt{(s \cdot s - w^2)}.$$

This calculation leads to a highly accurate result, but is very CPU-intensive.

As a further alternative, the window shift σ can be calculated as the fixed point of the fixed-point equation σ=φ(σ), wherein φ(σ)=b(1−1/√[(v²−1)(u²/{w−σ}²+1)+1]) and w and u are defined as indicated above. One or two iterations of this (converging) fixed-point equation produce (s) very accurate results and can be calculated quickly.

As soon as the parallel shift 49 is known, the optical path 47 can be traced back and the spatial point s can be calculated (or reconstructed), for example by a bundle adjustment method or a stereoscopic method.

The process of how the vehicle camera 40 can be calibrated during travel of the vehicle 33 is described in greater detail below.

Figure 1:
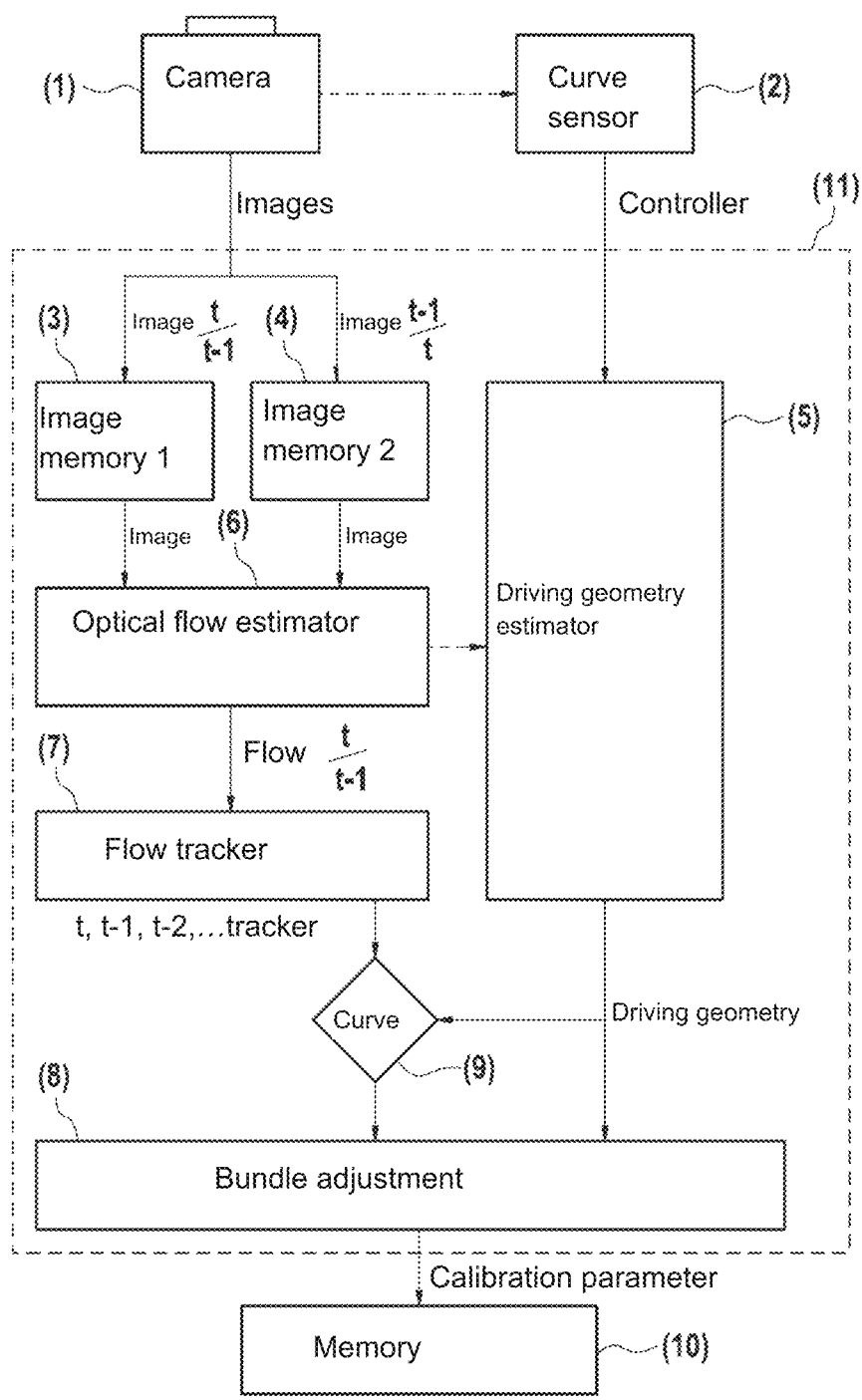
FIG. 1 shows a schematic representation of a device, e.g., a controller, and an autocalibration sequence in the controller, FIG. 2 schematically shows the geometry of the travel of the vehicle performing a cornering maneuver.

The interaction and a schematic representation of an autocalibration device are described on the basis of FIG. 1.

The vehicle camera 1 is installed in a moving vehicle 33 behind a windshield 32 or a protective glass so that the vehicle camera is aligned forwards (in the direction of travel). The vehicle camera 1 supplies images to a controller 11 at simultaneous intervals. In one embodiment of the present disclosure, the vehicle camera 1 can be integrated into the controller 11 or the vehicle camera and the controller can be integrated into a housing, which would correspond to a "smart camera".

In one embodiment of the present disclosure, a curve sensor 2 is installed in the vehicle 33 such that it sends information about the current velocity as well as the yaw rate of the vehicle 33 to the controller 11. In one embodiment of the present disclosure, the curve sensor 2 can be integrated into the controller 11. In a further embodiment of the present disclosure, the curve sensor 2 can utilize image data (as well as data from further calculation steps) to ascertain the yaw rate.

Memories for two successive images 3 and 4 at the points in time t and t−1 respectively (or alternately, which is not to be considered further here) are located in the controller 11. The two images are provided at the point in time t to an optical flow estimator 6, resulting in the so-called temporal flow from t−1 to t. This describes the movement of the pixels of objects (infinitesimally small spatial points) in the scene from time t−1 to t. The optical flow is tracked over time in a flow tracker 7, dynamic objects are filtered out, and outliers are eliminated. As a result, tracks of points are created, which track one and the same object over multiple images.

The information from the curve sensor 2 is processed in the controller 11 by a driving geometry estimator 5.

Figure 2:
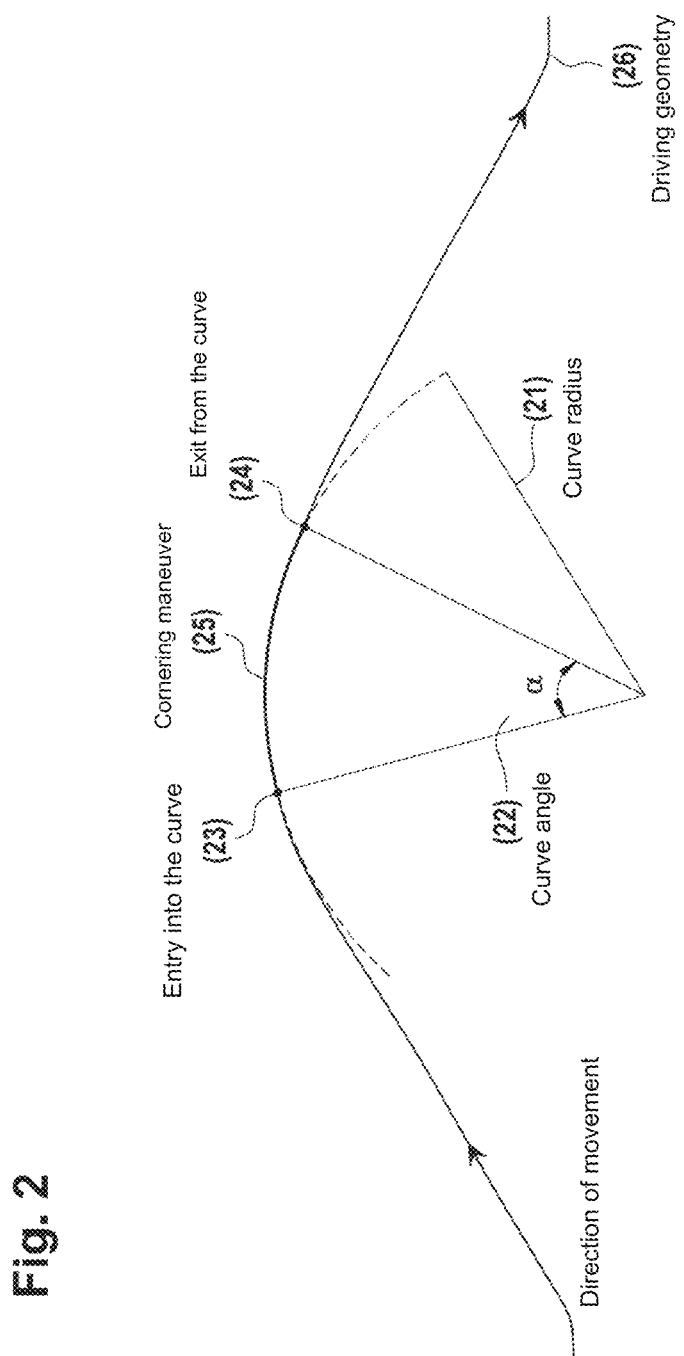

The estimation of the driving geometry 26 is discussed on the basis of FIG. 2. The driving geometry estimator 5 supplies the estimation of the driving geometry 26 in the plane. The driving geometry estimator 5 can also supply an assessment of which parameters can be estimated during or on the basis of the current cornering maneuver 25. The current cornering maneuver can be characterized by an entry point into the curve 23, a curve radius 21, a traversed curve angle 22 as well as an exit point from the curve 24. If the traveled curve corresponds to a particular curve type, the data from the portion of the journey as well as parameters which can be estimated are forwarded to the bundle adjustment algorithm 8.

In one embodiment of the present disclosure, the information of the curve sensor is inferred from the essential geometry between individual frames.

A bundle adjustment algorithm 8 takes either the latest calculated result or the estimation from the production or the nominal data for the given vehicle as a starting solution for the parameters which are characterized as estimable and refines these with the currently obtained flow tracks which have been established during the cornering maneuver.

The bundle adjustment method 8 can proceed according to prior art [1], with the difference that a normal camera model is not used as the projection model, but rather a projection model having a window is used. Such a projection model is the subject-matter of EP 3293701 B1. However, the target-based method proposed therein for calibrating a vehicle camera behind or together with the windshield is not compatible with dynamic autocalibration. The particular projection model is based on the approximate solution of an implicit path equation of the light propagation (equation 15 from EP 3293701 B1) according to the unknown projection in the image. The solution is performed by a series of approximations, which ultimately leads to the solution of an equation of the second degree (equation 43 from EP 3293701 B1). A setup is presented for the indicated model (cf. FIG. 3 from EP 3293701 B1), which can be deployed to establish the parameters of the model.

The model from EP 3293701 B1 can be further developed in that approximations are no longer necessary for the mathematical projection through the windshield or the approximations merely lead to very small errors. A further development of the model is described below. Therefore, it is possible to use the further developed model together with bundle adjustment for a dynamic calibration of the windshield.

A normal vector n of the windshield plane close to the vehicle camera, a thickness b of the windshield and/or a refractive index v of the windshield can be used as windshield parameters. The region close to the vehicle camera is in particular the region of the window around the principal point (or center of the field of view) of the vehicle camera. The normal vector n and the thickness b of the window can be initially determined, for example, by measurements at the end of the vehicle production line by geometric (e.g., target-based) measurements.

A parallel shift of the optical path caused by the windshield can be equated to the product of a window or slab shift σ having the normal vector n. This choice of calculating the parallel shift is very effective and can be calculated quickly. It can be shown by a direct calculation of the optical path.

The window shift σ can be approximated as a constant which makes possible an extremely fast calculation which attains good results for small viewing angles. In particular, the constant can be equated to $b(v-1)/v$, which corresponds to the exact solution for an optical path perpendicular to the windshield plane.

Alternatively, the window shift σ can be calculated as root g0 of the quartic function $$g(\sigma)=a_4\sigma^4+a_3\sigma^3+a_2\sigma^2+a_1\sigma+a_0,$$

wherein $0 \leq \sigma_0 \leq b$, $a_4=v^2$, $a_3=-2v^2(w+b)$, $a_2=(v^2-1)(u^2+b^2)+v^2w(w+4b)$, $a_1=-2b[v^2(w^2+u^2)+bw(v^2-1)-u^2]$, $a_0=(v^2-1)b^2(w^2+u^2)$, $w=n\cdot s$ and $u=\sqrt{(s\cdot s-w^2)}$. The point s is the point in the space of the scene which corresponds to the pixel in the image. This quartic function can be arrived at by calculating the optical path from point s to the origin at which a pinhole diaphragm of a pinhole camera is assumed. A rotation of the coordinates, at which the normal vector n lies in the direction of the $e_3$ axis and the point s lies in the $e_1$-$e_3$ plane, makes the calculation easier. The quartic function can be solved exactly by Ferrari's solution and has an unambiguous solution for g0 in the indicated region. This calculation leads to a highly accurate result, but is very CPU-intensive.

As a further alternative, the window shift σ can be calculated as the fixed point of the fixed-point equation $\sigma=\varphi(\sigma)$, wherein $\varphi(\sigma)=b(1-1/\sqrt{[(v^2-1)(u^2/\{w-\sigma\}^2+1)+1]})$, with $w=n\cdot s$ and $u=\sqrt{(s\cdot s-w^2)}$. In turn, s is the point in the space of the scene which corresponds to the pixel in the image. This fixed-point equation can be arrived at by calculating the optical path from point s to the origin at which a pinhole diaphragm of a pinhole camera is assumed. Here as well, a rotation of the coordinates, at which the normal vector n lies in the direction of the $e_3$ axis and the point s lies in the $e_1$-$e_3$ plane, makes the calculation easier. It can be shown that the fixed-point equation is a contraction with a Lipschitz constant delimited from above by $c=b/(w-b)$, which is less than one for all practical applications. Therefore, the fixed-point equation converges and a predefined precision can be attained with a finite number of iterations of the fixed-point equation. One or two iterations of this converging fixed-point equation produce(s) accurate results and can be quickly calculated.

If the projection model of the entire optical system is provided by the parameterizable mapping k, so that each pixel $p_{ij}$ corresponds to the i-th spatial point $s_i$ in the view j having the extrinsic parameters $\theta_j$ and the intrinsic parameters int and the parameters of the window ψ, the following equation is satisfied:

$$p_{ij}=k(s_i,\theta_j,\text{int},\psi)$$

In this case, it is assumed that the unknown parameters of the window ψ and the intrinsic parameter(s) int remain constant during a longer portion of the journey, such that merely $\theta_j$ differ from one view to the next view. In this respect, the intrinsic parameters int could be added to the window parameters w to produce parameters ψ' which are approximately constant for each portion of the journey.

In this case, $p_{ij}$ is not explicitly defined, but rather it is assumed that the measured pixels can be perfectly described by the camera image k. This means that if the corresponding extrinsic parameters $\theta_j$, 3D points (or spatial points) $s_i$, intrinsic parameters int and the window parameter(s) ψ are deployed, precisely the measured pixel is obtained according to the imaging equation.

Due to measurement errors or signal noise, this is of course never really the case and the $p_{ij}$'s used in the sum (of the error function) indicated below are actually to be understood to be noisy, which is why nonlinear optimization will not converge to the exact solution either, but only to one that is close thereto.

Now, taking the information obtained from the curve geometry estimator (5), this constitutes a very good starting solution for $\theta_j$. The rest of the method follows by (local) minimization of the bundle adjustment problem $$l(s_1, \ldots, s_n, \theta_1, \ldots, \theta_m, \text{int}, \psi) = \sum_{ij} \|p_{ij} - k(s_i, \theta_j, \text{int}, \psi)\|^2$$

for all unknowns, that is to say for the spatial points $s_1$ to $s_n$, the camera poses $\theta_1$ to $\theta_m$ as well as the parameters of the window ψ and, possibly, the intrinsic parameters int. The subscript n indicates that there are n 3D-points $s_i$ and the subscript m indicates that there are m views $\theta_j$ and, consequently, m extrinsic parameters. Minimization is carried out with standard methods of nonlinear optimization. In one embodiment, the Levenberg-Marquardt method can, e.g., be deployed.

The bundle adjustment minimization problem can also be formulated differently. First of all, all of the pixels $p_{ij}$ are written one below the other in a vector Y. In the same arrangement, all of the corresponding mappings $k(s_i, \theta_j, \text{int}, \psi)$ are written one below the other and all of the unknown parameters are summarized in the parameter vector P. In this way, the vector-valued function f(P) is defined. Without measurement noise, the idea would now be to determine the parameter vector P, for which the following applies:

$$f(P)=Y.$$

However, since the pixels contain measurement noise, the following stochastic model is used:
Y is a random variable with the expected value f(P) and the covariance matrix $\Sigma$ (is predefined in accordance with empirical knowledge).

Therefore, the bundle adjustment minimization problem can also be written as the following estimator:

$$P_{est} = \operatorname{argmin\_P} \frac{1}{2} * \|f(P) - Y\|\_\Sigma^2.$$

In order to obtain an approximation of the covariance matrix of this parameter vector estimator, the linear approximation $f(P)=f(P_0)+f'(P_0)*(P-P_0)$ is used, wherein $P_0$ designates the point around which we expand f linearly, and obtain $$P_{est}\_\text{approx} = \operatorname{argmin\_P} \frac{1}{2} * \|f(P_0) + f'(P_0)*(P - P_0) - Y\|\_\Sigma^2$$
$$= P_0 + \left[f'(P_0)^T \Sigma^{-1} f'(P_0)\right]^{-1} f'(P_0)^T \Sigma^{-1} (Y - f(P_0)),$$

wherein invertibility is assumed at this point.

The following is obtained with the formula for the propagation of the covariance matrix:

$$\operatorname{COV}(P_{est}\_\text{approx}) = \left(f'(P_0)^T \sum\nolimits^{-1} f'(P_0)\right)^{-1}.$$

Ideally, we would choose the true parameter vector as the expansion point $P_0$. However, since this is not available, the estimated parameter vector is used as the expansion point as the best approximation at hand and thus $\operatorname{COV}_{approx}=(f'(P_{est})^T \Sigma^{-1} f'(P_{est}))^{-1}$ is obtained as the approximative covariance matrix for the estimated parameters.

This must now be investigated after each (successful, meaning, e.g., that RMSE check was successful) estimation in terms of ambiguities/imprecisions.

The result of the calculation of the bundle adjustment method 8 is refined vehicle poses, a reconstruction of the spatial surroundings of the motionless scene, as well as the refined intrinsic and windshield parameters. The method can be made more robust by way of numerous modifications [1]. In one embodiment of the present disclosure, the results of the optimization can be refined by averaging or filtering. As a result, due to the properties of the method, a level of precision can be achieved after only a small number of filtering steps which is equivalent to the current production prior art.

In one embodiment of the present disclosure, the intrinsic parameters int of the camera 40 are also estimated. It is then advantageous for the success of the above bundle adjustment 8 that the camera has certain properties. In one embodiment of the present disclosure, the camera and, consequently the camera model k above, has non-vanishing radial distortions [2]. The latter is typical of today's vehicle cameras. In a further embodiment, in addition to the last comment, the camera has non-vanishing tangential distortions.

At the end of the calculation the result is additionally validated. If the result is positive (the calibration has succeeded), the resulting camera parameters are possibly saved in the memory 10 for further processing. If the result is negative, the calibration can be ambiguous or erroneous. The ambiguity can be established, for example, on the basis of the Jacobian matrix of a vector-valued mapping/residual function and on the basis of the Hessian matrix of the error function, evaluated at the minimum point found $(J^T\Sigma J)^{-1}$ (cf. above). In principle, an eigenvector analysis of the inverse Hessian matrix of the error function is performed. This can also be understood to be an approximated covariance matrix $\operatorname{COV}_{approx}$ of the estimated parameters.

The latter information also indicates which parameters could not be unambiguously established. In this case, the corresponding vehicle movement can be marked as unfavorable for the establishment of all or the corresponding set of parameters. In this way, the decision as to which parameters are to be estimated for which curve types (see decision step 'curve' 9 in FIG. 1) can be advantageously improved during travel, without making a rigorous preliminary investigation of the corresponding conditions. A faulty calibration is recognized by the high value of the error function I. If the calibration is faulty, the result is discarded.

Figure 5:
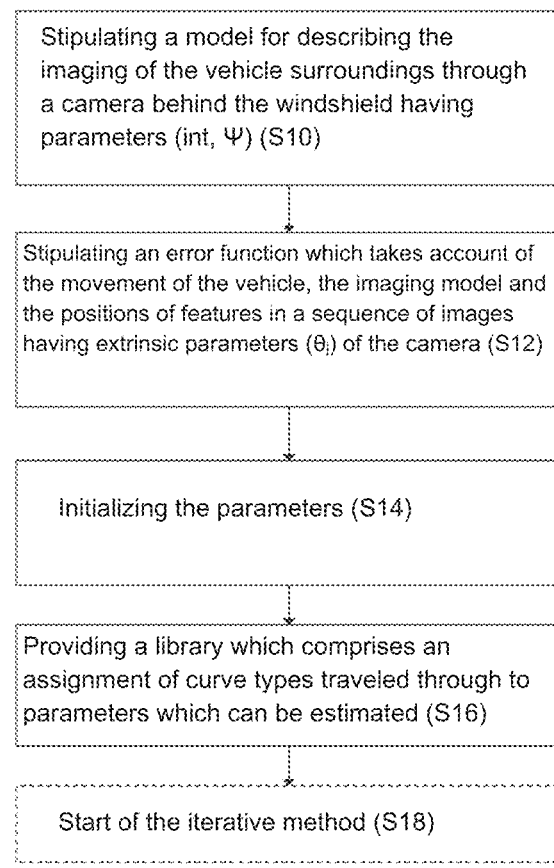
FIG. 5 shows a schematic overview of the beginning of a method for autocalibration.

FIG. 5 illustrates, by way of example, the beginning of an autocalibration method. In a first step S10, a model for describing the imaging of the surroundings of the vehicle by a camera inside the vehicle behind the windshield is stipulated or provided or predefined. The model has both intrinsic camera parameters int and at least one parameter $\psi$ for characterizing the windscreen.

In a further step S12, an error function is stipulated, which takes account of the movement of the vehicle, the imaging model and the positions of features (e.g., pixels) in a sequence of images. Extrinsic parameters $\theta_j$ of the camera are taken account of. The extrinsic parameters $\theta_j$ are substantially determined by the movement of the vehicle.

In a further step S14, the parameters are initialized. The intrinsic parameters int and the windshield parameter(s) $\psi$ can be adopted from the factory calibration.

In a step S16, a library is provided, which includes an assignment of curve types traveled through to parameters which can be estimated. This library can have been created by earlier (test) journeys. The method from DE 102018204451 A1 can be used to create a very rudimentary library. It is also possible that the library is initially empty. The library serves to allow content, namely information about which curve type is suitable for determining which parameters, to be stored by running through the method iteratively.

Figure 6:
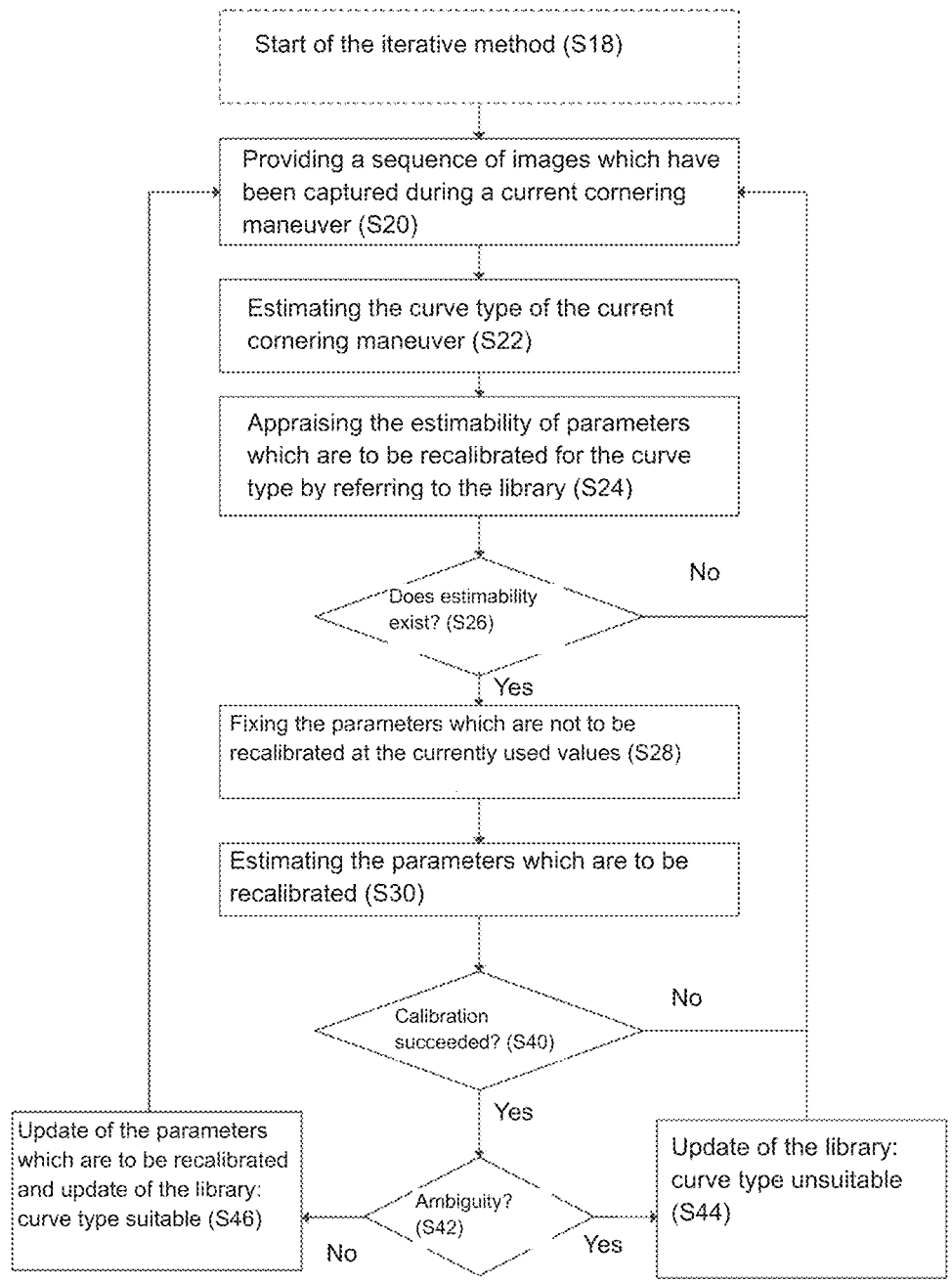
FIG. 6 shows an iterative sequence of a calibration method by determining parameters.

In step S18, the iterative part of the method is started, which is illustrated in FIG. 6.

The representation in FIG. 6 begins with the start of the iterative method S18.

In step S20, a sequence of images from the camera is provided, which have been captured during a current cornering movement.

In step S22, the curve type of the current curve movement is estimated, e.g., by a curve or driving geometry estimator. In the event that it is estimated that the vehicle is currently driving straight ahead, new images can be requested from, or provided by, the camera.

In step S24, the estimability of parameters to be recalibrated is appraised for the estimated curve type by referring to the library. An appraisal of the estimability of parameters which are potentially to be recalibrated is conducted due to the current curve movement.

Step S26 relates to the question or decision as to whether estimability does exist for at least one parameter to be recalibrated.

If it is to be inferred from the library that the current curve type is not suitable for estimating parameters, the process is started again with step S20. In addition to driving straight ahead, this can also be the case for other curve types.

Otherwise, the library is referred to in order to ascertain for which of the parameters estimability does exist. If, e.g., it only exists for one parameter (according to the library), the remaining parameters ("parameters which are not to be recalibrated") are fixed at the currently used values in step S28. Then only the one parameter to be recalibrated is still a free parameter and can be updated hereinafter. The situation can occur that all of the parameters have to be recalibrated, in which case there is no fixing of the parameters.

In step S30, the free parameters or parameters to be recalibrated are (re) estimated. The details will be explained later on the basis of FIG. 7. The new parameter(s) is/are substantially determined by minimizing an error function.

Step S40 relates to the decision as to whether the calibration by the newly estimated parameters has succeeded. If the error function outputs a value which is above a threshold value, this means that the calibration has failed and the newly estimated parameters are discarded. The process is subsequently started again with step S20.

If the error function outputs a value which does not exceed the threshold value, the calibration is deemed to have succeeded and a decision is made in step S42 as to whether there is an ambiguity in the estimated parameters (the potentially recalibrated parameters, that is to say the parameters which were previously to be recalibrated).

If the estimated parameter(s) is/are ambiguous, the library is updated in step S44 for the current curve type in such a way that this curve type is unsuitable for recalibrating the (ambiguously) estimated parameters. Since the parameters could not be estimated unambiguously, no parameters are updated in this case. The method is continued with step S20.

If, on the other hand, the estimated parameter(s) is/are unambiguous, the library for the current curve type is updated in step S46 in such a way that this curve type is suitable for the recalibrated parameter(s) (to be recalibrated). A check as to which parameter(s) could be estimated better than previously or "precisely enough" can be carried out within the framework of a covariance evaluation. This is described by way of example in the next paragraph. In other words, the curve estimator is updated in such a way that it memorizes the parameter(s) which could be estimated well for this type of curve. This/these parameter(s) is/are updated and the method is restarted from step S20.

Of course, the updated or all of the current parameters can be output within the framework of step S46 or read out then or at any time required and used for image evaluation functions, detection methods or calibration or correction mechanisms.

Exemplary Sequence of a "Precise Enough" Appraisal with a Covariance Matrix:

Illustrative Summary:
   A covariance matrix can be conceived of as an n-error hyperellipsoid. Depending on which probability measure is to be expressed, this ellipsoid is scaled larger or smaller (this can be indicated using quantiles, for example).
   Superimpose a centered n-dimensional cuboid over the n-ellipsoid, with edge lengths which correspond to the acceptable precision tolerance.
   All of the coordinate directions (and therefore the parameters corresponding thereto), in which the extent of the ellipsoid does not exceed the cuboid limit, fit, all others have been estimated too imprecisely.

With Formulae:

$$\text{Consider cuboid } Q = X\_(i = 1 \ldots L)[-b_i, b_i],$$

$$b_i = \sqrt{Chi_{L,p}^2 * \text{COV\_approx}_{i,i}}$$

(this completely encompasses the n-error hyperellipsoid regarding the probability measure p and touches it on the sides) (X denotes the Cartesian product and $Chi_{L,p}^2$ the p-quantile of the Chi^2 distribution with L degrees of freedom)

That is to say that to ensure that the requirement in the i-th coordinate direction is met, the following merely has to be checked:

$$\sqrt{Chi_{L,p}^2 * \text{COV\_approx}_{i,i}} \leq a_i$$

wherein $Q_a = X\_(i=1 \ldots L)$ $[-a_i, a_i]$, denotes the requirements cuboid.

Brief Description of an Exemplary Embodiment and Further Aspects of the Method:

You are driving the car and for each estimated curve type you look at whether it is a new curve type or one about which you have already learnt something (this distinction is only made here for illustrative purposes; the distinction is subsequently obsolete in the method due to the loop, since therein a new curve type is simply one in which all of the parameters can still be estimated based on experience).
   If new: calculate the parameter estimation as usual (all of the parameters are kept as variable).
   If known: check the previously collected information about the parameters to see whether there are any parameters which do not lead to ambiguities in the case of this curve type. If so, then fix all of the parameters in the cost function which, according to previous experience with this type of curve, have led to ambiguities and calculate an estimation for the free parameters.
(Fixing to the Values which have Previously been Used for these Parameters)
   If the calibration is successful (e.g. RMSE, root square mean error, smaller than a certain threshold, perform an analysis of the covariance matrix. This can, e.g., look like the following:
   calculate eigenvalues and eigenvectors of $COV^{-1}$ ($P_{e\_st}\_\text{approx}$)=($f'(P_0)^T \Sigma^{-1} f'(P_0)$)).
   Incidental remark: If $COV^{-1}$ has the eigenvalue $\mu$, then COV has the eigenvalue $1/\mu$, the eigenvector remains the same
   Eigenvectors for eigenvalues "close to 0"/"too small" (that is to say, those would be eigenvectors for very large eigenvalues in the case of COV→very large uncertainty) display with their entries, which are clearly not equal to 0, which parameters cannot be estimated well together (that is to say, indicates a potential group of parameters which cannot be estimated well together).
   Store this information for the current curve type fix, next time this curve type appears, one parameter in each case from the groups which cannot be estimated together (for example, one with a large entry in the eigenvector and those which lie at the intersection of multiple groups).

Then, following estimation, run the same analysis again for the parameters which are not fixed, that is to say, free and, therefore, estimated (→ in this way, you will "converge" on a set of parameters which can be estimated).

As soon as an estimation is carried out for the same curve type (possibly after a few iterations), in which the covariance analysis does not indicate an ambiguity for any of the estimated parameters (do not update during the previous runs where ambiguities still came from the covariance analysis):

update all of the parameters which are not fixed, that is to say free and therefore estimated, which have been estimated "precisely enough" (the covariance can again be used in order to appraise "precisely enough," see explanation above)

Figure 7:
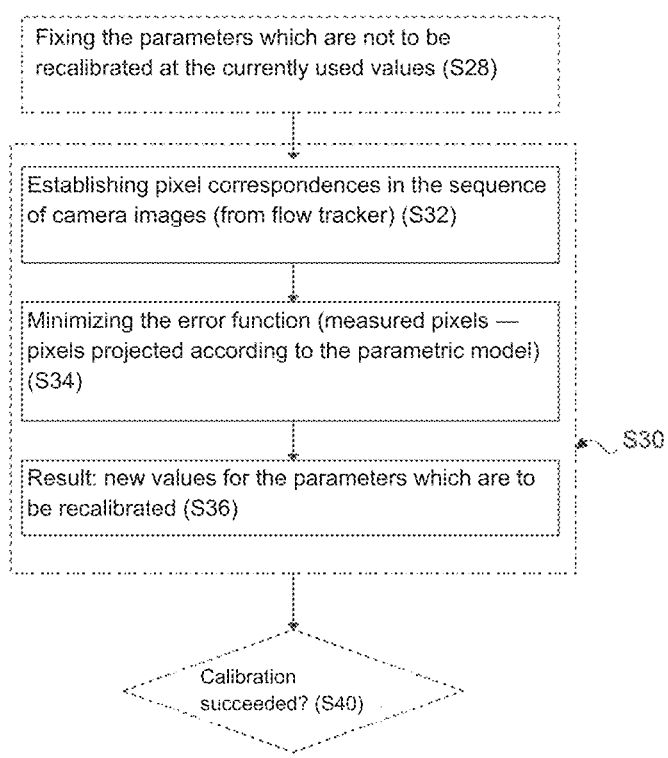
FIG. 7 shows details for estimating the parameters.

FIG. 7 illustrates details for estimating the parameters S30. After the parameters which are not to be recalibrated have been fixed at the currently or previously used values, the parameters to be recalibrated (step S30) are estimated as follows:

In step S32, pixel correspondences in the sequence of the camera images are established, for example, by the optical flow estimator or the flow tracker. The extrinsic parameters or an estimation of the same can be provided by the curve estimator.

In step S34, the error function is minimized. The error function takes account of the deviation between the established or measured pixels and pixels projected according to the parametric model for a plurality of images from the image sequence.

As a result, the new values for the parameters to be recalibrated are recorded in step S36.

Subsequently, it is decided in step S40 (cf. FIG. 6) whether the calibration has succeeded.

The invention claimed is:

1. A method for vehicle camera autocalibration during travel of a vehicle, wherein the vehicle camera images a region of surroundings of the vehicle through a window, the method comprising:
    a) providing a projection model of the vehicle camera, wherein the projection model comprises, as parameters, multiple extrinsic parameters, at least one intrinsic parameter of the vehicle camera and at least one parameter characterizing the window,
    b) capturing a sequence of images by the vehicle camera during cornering by the vehicle,
    c) determining a curve type on the basis of current movement of the vehicle during cornering by a curve estimator,
    d) estimating the parameters, based on
    pixels in the sequence of images corresponding to stationary objects in the surroundings of the vehicle,
    the current movement of the vehicle, and
    the determined curve type,
    by minimizing or reducing an error function indicating a deviation between pixels which correspond to the stationary objects in the surroundings of the vehicle and which are established from the sequence of images and pixels of the stationary objects which are projected by the projection model, and
    e) outputting at least one of the estimated parameters.

2. The method according to claim 1, further comprising, following estimating the parameters, checking whether the vehicle camera calibration has succeeded on the basis of a threshold for the minimized or reduced error function.

3. The method according to claim 2, further comprising, in the event of the autocalibration having succeeded, carrying out an ambiguity analysis as to which parameter(s) have been estimated precisely enough and this parameter is/are output.

4. The method according to claim 1, further comprising, in addition to the estimated parameters outputting an item of information to a library, wherein the library comprises an assignment of curve types traveled through to parameters which are estimated in each case, and wherein the output information indicates whether and for which parameter(s) an unambiguous estimation for the current curve type is successful.

5. The method according to claim 4, further comprising carrying out an appraisal of the estimability of parameters to be recalibrated for the current curve type by referring to the library and an estimation of the parameter(s) to be recalibrated is only conducted if estimability exists.

6. The method according to claim 3, wherein the ambiguity analysis comprises a covariance evaluation.

7. The method according to anyone-of-the-preceding claim 1, further comprising initializing at least one of the intrinsic and/or window parameters, wherein the initialization is carried out from a factory calibration of the vehicle camera.

8. The method according to claim 1, further comprising determining a starting solution for the extrinsic parameters from the current movement of the vehicle during cornering.

9. The method according to claim 1, further comprising establishing pixels or image features which correspond to stationary objects in the surroundings of the vehicle from the sequence of images by at least one of an optical flow estimator or a flow tracker.

10. The method according to claim 1, wherein the at least one parameter characterizing the window comprises a thickness of the window.

11. The method according to claim 1, wherein the at least one parameter characterizing the window comprises a direction of the window.

12. A device for autocalibration of a vehicle camera during travel of the vehicle, comprising:
    the vehicle camera which is configured to image a region of surroundings of the vehicle through a window;
    a computing unit which is configured to provide a projection model of the vehicle camera, wherein the projection model comprises, as parameters, multiple extrinsic parameters, at least one intrinsic parameter of the vehicle camera and at least one parameter characterizing the window,
    wherein the vehicle camera is configured to capture a sequence of images during cornering by the vehicle,
    wherein a curve estimator which is configured to determine a curve type on the basis of current movement of the vehicle during cornering by the vehicle;
    wherein the computing unit is configured to estimate parameters, taking account of:
    pixels in the sequence of images corresponding to stationary objects in the surroundings of the vehicle,
    the current movement of the vehicle, and
    the determined curve type,
    wherein the computing unit estimate parameters by minimizing or reducing an error function indicating a deviation between pixels which correspond to the stationary objects in the surroundings of the vehicle and which are established from the sequence of images and pixels of the stationary objects which are projected by the projection model, and an output unit for outputting the estimated parameters, wherein at least one processor circuit is configured to perform as the computing unit, the curve estimator and the output unit.

13. A vehicle having a vehicle camera and a device according to claim 12.

14. A non-transitory computer program element containing instructions when executed by a data processing hardware performs the method according to claim 1.

15. A non-transitory computer-readable storage medium on which the computer program element according to claim 14 is stored.

* * * * *